United States Patent [19]

Rose et al.

[11] Patent Number: 4,683,066
[45] Date of Patent: Jul. 28, 1987

[54] ANIONIC FLOCCULANT FOR DEWATERING STEEL MILL SLUDGES

[75] Inventors: Gerard R. Rose, Park Ridge; Ralph W. Kaesler, Schaumburg; Dodd W. Fong, Naperville, all of Ill.

[73] Assignee: Nalco Chemical Company, Naperville, Ill.

[21] Appl. No.: 884,833

[22] Filed: Jul. 11, 1986

[51] Int. Cl.$^4$ ................................. C02F 1/56
[52] U.S. Cl. ................................. 210/734; 524/922
[58] Field of Search ............... 210/725, 727, 728, 733, 210/734; 526/287, 288; 524/922

[56] References Cited

U.S. PATENT DOCUMENTS

| | | | |
|---|---|---|---|
| 3,541,009 | 11/1970 | Arendt et al. | 210/728 |
| 3,692,673 | 9/1972 | Hoke | 210/728 |
| 4,147,681 | 4/1979 | Lim et al. | 210/734 |
| 4,342,653 | 8/1982 | Halverson | 210/734 |
| 4,545,902 | 10/1985 | Connelly et al. | 210/734 |
| 4,555,346 | 11/1985 | Rosen et al. | 209/5 |
| 4,569,768 | 2/1986 | McKinley | 210/734 |
| 4,599,390 | 7/1986 | Fan et al. | 210/734 |

OTHER PUBLICATIONS

*The Condensed Chemical Dictionary*, 8th edition, Von Nostrand Reinhold Company, 1971, p. 848.

*Primary Examiner*—Peter Hruskoci
*Attorney, Agent, or Firm*—John G. Premo; Donald G. Epple; Anthony L. Cupoli

[57] ABSTRACT

A method of dewatering BOF scrubbing liquid sludges which contain large amounts of finely divided iron oxides which comprises treating these sludges with a dewatering amount of an acrylamide acrylic acid, N-substituted lower alkyl acrylamide sulfonate terpolymer which contains from 35–80 mole percent of acrylamide, from 10–60 mole percent of acrylic acid and from 1–30 mole percent of the N-substituted lower alkyl acrylamide sulfonate which terpolymer has a reduced specific viscosity (RSV) of at least 25.

3 Claims, No Drawings

ANIONIC FLOCCULANT FOR DEWATERING STEEL MILL SLUDGES

INTRODUCTION

In the production of steel using the basic oxygen furnace, large quantities of inorganic impurities are generated. These impurities are primarily finely divided particles of iron oxide. They are collected in a collecting system subjected to a water scrubbing operation. These scrubbing waters containing the predominately iron oxide impurities are sent to clarifiers where they are subjected to removal by settling. These solids form a sludge which contains between 30–35% by weight solids.

It is customary to subject these sludges to conventional dewatering operations using as dewatering aids water-soluble polyelectrolytes. The present invention deals with an improved acrylamide polymer which provides superior dewatering of BOF scrubbing liquid sludges.

THE INVENTION

A method of dewatering BOF scrubbing liquid sludges which contain large amounts of finely divided iron oxides which comprises treating these sludges with a dewatering amount of an acrylamide acrylic acid, N-substituted lower alkyl acrylamide sulfonate terpolymer which contains from 35–80 mole percent of acrylamide, from 10–60 mole percent of acrylic acid and from 1–30 percent of the N-substituted lower alkyl acrylamide sulfonate which terpolymer has a reduced specific viscosity (RSV) of at least 25.

The useful dewatering flocculants of this invention are acrylamide polymers which contain both carboxylate and sulfonate groups and which are further characterized as having reduced specific viscosities greater than 25. These polymers are prepared in a preferred practice of the invention by utilizing a water-in-oil polymerization technique followed directly by modification of the polymer with Taurine or $CH_2O/Na_2SO_3$, as a water-in-oil emulsion, which will be more fully described hereinafter.

As indicated, the polymers of this invention contain acrylamide, either acrylic acid or methacrylic acid, and amounts of N-substituted lower alkyl acrylamide sulfonate groups. The lower alkyl acrylamide sulfonate moieties of the polymer preferably contain lower alkyl groups containing from 1–6 carbon atoms with preferred materials being N-methyl sulfonate substituted acrylamide and N-ethyl sulfonate substituted acrylamides.

The polymers as indicated are utilized in the form of water-in-oil emulsions and are prepared using a water-in-oil emulsion and polymer modification technique.

THE WATER-IN-OIL EMULSIONS OF WATER-SOLUBLE ACRYLAMIDE TERPOLYMERS

The water-in-oil emulsions of water-soluble acrylamide terpolymers useful in this invention contain four basic components. These components and their weight percentages in the emulsions are listed below:

A. Water-soluble acrylamide terpolymers:
  1. Generally from 5–60%
  2. Preferably from 20–40%; and
  3. Most preferably from 25–35%;
B. Water:
  2. Generally from 20–90%;
  2. Preferably from 20–70%; and
  3. Most preferably from 30–55%;
C. Hydrophobic liquid:
  1. Generally from 5–75%;
  2. Preferably from 5–40%; and
  3. Most preferably from 20–30: and,
D. Water-in-oil emulsifying agent:
  1. Generally from 0.1–21%:
  2. Preferably from 1–15%;
  3. Most preferably from 1.2–10%.

It is also possible to further characterize the water-in-oil emulsions of acrylamide terpolymers with respect to the aqueous phase of the emulsions. This aqueous phase is generally defined as the sum of the polymer present in the emulsion plus the amount of water present in the emulsion. This terminology may also be utilized in describing the water-in-oil emulsions which are useful in this invention. Utilizing this terminology, the aqueous phase of the water-in-oil emulsions of this invention generally consists of 25–95% by weight of the emulsion. Preferably, the aqueous phase is between 60–90% and most preferably from 65–85% by weight of the emulsion.

The emulsions also may be characterized in relation to the water/oil ratios. This figure is simply a ratio of the amount of water present in the emulsion divided by the amount of hydrophobic liquid present in the emulsion. Generally, the water-in-oil emulsions of this invention will have a water/oil ratio of from 0.25 to 18. Preferably, the water/oil ratio will range from 0.5–14, and most preferably from 1.0–2.75.

THE HYDROPHOBIC LIQUIDS

The hydrophobic liquids or oils used in preparing these emulsions may be selected from a large group of organic liquids which include liquid hydrocarbons and substituted liquid hydrocarbons.

A preferred group of organic liquids that can be utilized in the practice of this invention are paraffinic hydrocarbon oils. Examples of these types of materials include a branched-chain iso-paraffinic solvent sold by Humble Oil and Refinery Company under the tradename "Isopar M" described in U.S. Pat. No. 3,624,019 and a paraffinic solvent sold by the Exxon Company, U.S.A. called "Low Odor Paraffinic Solvent". Typical specifications of this material are set forth below in Table I.

TABLE I

| | |
|---|---|
| Specific Gravity 60°/60° F. | 0.780–0.806 |
| Color, Saybolt | +30 min. |
| Appearance, visual | Bright and Clear |
| Aniline Point, °F., ASTM D-611 | 160 min. |
| Distillation, °F., ASTM D-86 | |
| IBP | 365 min. |
| FBP | 505 max. |
| Flash Point, °F., TCC | 140 min. |
| Sulfur, ppm, Microcoulometer | 15 max. |

While paraffinic oils are the preferred materials for use in preparing the water-in-oil emulsions of this invention, other organic liquids can be utilized. Thus, mineral oils, kerosenes, naphthas, and in certain instances petroleum may be used. While useful in this invention, solvents such as benzene, xylene, toluene, and other water immiscible hydrocarbons having low flash points or toxic properties are generally avoided due to problems associated with their handling.

THE WATER-IN-OIL EMULSIFYING AGENTS

Any conventional water-in-oil emulsifying agent can be used such as sorbitan monostearate, sorbitan monooleate, and the so-called low HLB materials which are all documented in the literature and are summarized in the Atlas HLB Surfactants Selector. Preferred however are polymeric emulsifying agents as described in U.K. Pat. No. 1,482,515. It is also contemplated, however, that other water-in-oil emulsifying agents can be utilized.

U.S. Pat. No. 3,997,492 shows the use of emulsifiers generally having higher HLB values to produce stable emulsions similar in character to those discussed above. With the use of the equations present in this reference, which is hereinafter incorporated by reference, emulsifiers having HLB values between 4-9 can be utilized in the practice of this invention.

In addition to the reference described above, U.S. Pat. No. 4,024,097 discloses particular emulsifying agents for the water-in-oil emulsions, which are the subject of this invention. These emulsions are generally prepared according to this reference utilizing a water-in-oil emulsifying agent comprising a partially esterified lower N,N-dialkanol substituted fatty amide. Additionally, other surfactants such as polymeric surfactants may be combined to produce emulsions having small particle sizes and excellent storage stability.

PREPARATION OF THE STARTING ACRYLAMIDE EMULSION TERPOLYMERS

The general method for the preparation of emulsions of the type described is contained in Vanderhoff, U.S. Pat. No. 3,284,393, which is hereinafter incorporated by reference. A typical procedure for preparing water-in-oil emulsions of this type includes preparing an aqueous solution of acrylamide and adding this solution to one of the hydrocarbon oils described above. With the addition of a suitable water-in-oil emulsifying agent and under agitation, the emulsion is then subjected to free radical polymerization conditions and a water-in-oil emulsion of the acrylamide polymer is obtained. It should be pointed out that the ingredients are chosen based upon the weight percentages given above and their compatability with each other. As to choice of free radical catalyst, these materials may be either oil or water-soluble and may be from the group consisting of organic peroxides, Vazo[1] type materials, redox type initiator systems, etc. Additionally, ultraviolet light, microwaves, etc. will also cause the polymerization of water-in-oil emulsions of this type.
[1]Reg. TM, E. I. duPont In the manufacture of emulsions of this type, which are further detailed in U.S. Pat. No. 3,624,019, reissue U.S. Pat. No. Re 28,474, U.S. Pat. No. 3,734,873, reissue U.S. Pat. No. Re 28,576, U.S. Pat. No. 3,826,771, all of which are hereinafter incorporated by reference, the use of air may be employed to control polymerization. This technique is described in U.S. Pat. No. 3,767,629 which is also hereinafter incorporated by reference.

In addition to the above references, U.S. Pat. No. 3,996,180 describes the preparation of water-in-oil emulsions of the types utilized in this invention by first forming an emulsion containing small particle size droplets between the oil, water, acrylamide and water-in-oil emulsifying agent utilizing a high shear mixing technique followed by subjecting this emulsion to free radical polymerization conditions. Also of interest is U.S. Pat. No. 4,024,097 which describes water-in-oil emulsions such as those described above utilizing particular surfactant systems for the water-in-oil emulsifying agent, allowing for the preparation of latexes having small polymer particle sizes and improved storage stability.

Another reference, U.S. Pat. No. 3,915,920, discloses stabilizing water-in-oil emulsions of the type above described utilizng various oil-soluble polymers such as polyisobutylene. Employment of techniques of this type provides for superior stabilized emulsions.

Of still further interest is U.S. Pat. No. 3,997,492 which describes the formation of water-in-oil emulsions of the type above described utilizing emulsifiers having HLB values of between 4-9.

Of pertinence is U.S. Pat. No. 4,077,930 and U.S. Pat. No. 3,920,599 which specifically deal with water-in-oil polymerization methods for DADMAC polymers.

PHYSICAL PROPERTIES OF THE WATER-IN-OIL EMULSIONS

The water-in-oil emulsions of the finely divided acrylamide polymers useful in this invention contain relatively large amounts of polyacrylamide. The polymer dispersed in the emulsion is quite stable when the particle size of the polymer is from the range of 0.1 micron up to about 5 microns. The preferred particle size is generally within the range of 0.2 microns to about 3 microns. A most preferred particle size is generally within the range of 0.2 to 2.0 microns.

The emulsions were prepared using reaction conditions to produce an acrylamide polymer having an RSV of at least 25. It will be seen, however, that the viscosity of these emulsions can be affected greatly by increasing or decreasing the polymer content, oil content, or water content as well as the choice of a suitable water-in-oil emulsifier.

Another factor contributing to the viscosity of these types of emulsions is the particle size of the polymer which is dispersed in the discontinuous aqueous phase. Generally, the smaller the particle obtained the less viscous the emulsion. At any rate, it will be readily apparent to those skilled in the art as to how the viscosity of these types of materials can be altered. It will be seen that all that is important in this invention is the fact that the emulsion be somewhat fluid, i.e. pumpable.

MODIFICATION OF THE ACRYLAMIDE WATER-IN-OIL EMULSION POLYMER TO PRODUCE THE TERPOLYMERS OF THE INVENTION

For the modification of acrylamide water-in-oil emulsion polymers, the above described acrylamide emulsions are reacted with either an amino alkyl sulfonate such as taurine to produce the lower alkyl sulfonate substituted acrylamide portion of the terpolymer or in the case of the methyl homologues with formaldehyde and sodium sulfite. Preparation of polymers of this type are set forth below as general preparative schemes.

A typical procedure for the preparation of a high RSV taurine modified polyacrylamide (PAM) involves mixing the above prepared PAM emulsion with 1-4 weight percent Span 80, 5-10 weight percent low odor paraffinic solvent (LOPS), and a 3-20 mol percent of aqueous sodium taurate. The entire latex mixture is purged with $N_2$ for 30 minutes and heated at 140°–165° C. for 1–3 hours.

A typical $CH_2O/Na_2SO_3$ modification involves addition of 10–30 mol percent aqueous $CH_2O$ over 1–2 hours to a mixture of PAM emulsion, LOS and Span 80 at 140°–165° C.

Using the above preparative techniques, it has been found that depending upon the particular temperature employed that a portion of the acrylamide groups of the polymers are converted to acrylic acid groups thus providing the terpolymer of the invention.

Using the above described techniques, the following polymers were prepared:

| Polymer No. | $SO_3^-/COO^-/CONH_2$ (MOL %) | RSV |
|---|---|---|
| Modification with $CH_2O/Na_2SO_3$ | | |
| 150 | 4.2/42.5/53.2 | 30.8 |
| 156 | 8.3/38.87/52.9 | 30.9 |
| 163 | 3.0/46.7/50.3 | 52.5 |
| 169 | 2.7/34.9/62.4 | 51.3 |
| 180 | 3.5/43.9/52.6 | 44.8 |
| 185 | 3.9/32.8/63.3 | 44.3 |
| Modification with Taurine | | |
| 83 | 2.2/23.2/74.6 | 56.1 |
| 85 | 4.7/57.9/37.4 | 29.7 |
| 87 | 10.5/14.8/74.7 | 24.4 |
| 100 | 9.5/18.9/71.6 | 50.0 |
| 102 | 5.6/25.9/67.6 | 30.8 |
| 105 | 8.8/20.6/70.6 | 32.5 |

THE INVERSION OF THE WATER-IN-OIL EMULSIONS OF THE ACRYLAMIDE TERPOLYMERS

The water-in-oil emulsions of the acrylamide terpolymers discussed above have unique ability to rapidly invert when added to aqueous solution in the presence of an inverting agent or physical stress. Upon inversion, the emulsion releases the polymer into water in a very short period of time when compared to the length of time required to dissolve a solid form of the polymer. This inversion technique is described in U.S. Pat. No. 3,624,019 and U.S. Pat. No. 4,077,930, hereinafter incorporated by reference. As stated in the Anderson reference, the polymer-containing emulsions may be inverted by any number of means. The most convenient means resides in the use of a surfactant added to either the polymer-containing emulsion or the water into which it is to be placed. The placement of a surfactant into the water causes the emulsion to rapidly invert and release the polymer in the form of an aqueous solution. When this technique is used to invert the polymer-containing emulsion the amount of surfactant present in the water may vary over a range of 0.01 to 50% based on the polymer. Good inversion often occurs within the range of 1.0–10% based on polymer.

The preferred surfactants utilized to cause the inversion of the water-in-oil emulsion of this invention when the emulsion is added to water are hydrophilic and are further characterized as being water soluble. Any hydrophilic type surfactant such as ethoxylated nonyl phenols, ethoxylated nonyl phenol formaldehyde resins, dioctyl esters of sodium succinate and octyl phenol polyethoxy ethanols, etc. can be used. Preferred surfactants are generally nonyl phenols which have been ethoxylated with between 8–15 moles of ethylene oxide. A more complete list of surfactants used to invert the emulsion are found in Anderson, U.S. Pat. No. 3,624,019 at columns 4 and 5.

To illustrate the benefits of these polymers in treating BOF scrubbing liquid sludges, the following is presented:

EVALUATION OF THE INVENTION

New polymers have been prepared from polyacrylamide and taurine or polyacrylamide and $CH_2O/Na_2SO_3$ with very high RSV, i.e. greater than 25. In dewatering tests on steel mill BOF sludges these products have shown improved performance relative to the current products of choice: 63/37 acrylamide/acrylate polymer and a 75/25 acrylamide/acrylate polymer. The improved performance of these products was manifested in either an increased rate of water drainage from the treated sludge and/or onset of activity at lower dosages. The results of these tests are listed in Table II.

TABLE II

Sample size = 200 mls sludge
Dilution water = 50 mls

| Example | MLS Product Used[1] | Filtration Volume (mls) | | |
|---|---|---|---|---|
| | | at 5 | 10 | 15 seconds |
| 63/37% AcAm/Acr[2] | 15 | 50 | 64 | 72 |
| | 20 | 75 | 84 | 90 |
| | 25 | 70 | 82 | 86 |
| | 15 | 68 | 78 | 82 |
| | 20 | 60 | 80 | 88 |
| 75/25% AcAm/Acr[2] | 15 | 47 | 54 | 56 |
| | 20 | 70 | 80 | 88 |
| | 25 | 80 | 86 | 90 |
| | 15 | 80 | 90 | 95 |
| | 15 | 70 | 92 | 94 |
| | 20 | 80 | 90 | 95 |
| | 15 | 70 | 84 | 90 |
| | 20 | 80 | 90 | 95 |
| Polymer No. 83[3] | 10 | 60 | 70 | 75 |
| | 15 | 80 | 90 | 94 |
| | 10 | 50 | 65 | 75 |
| | 15 | 80 | 90 | 95 |
| | 20 | 80 | 90 | 95 |
| Polymer No. 100[3] | 10 | 20 | 30 | 35 |
| | 15 | 60 | 80 | 90 |
| | 20 | 40 | 60 | 75 |
| | 10 | 45 | 50 | 54 |
| | 15 | 80 | 88 | 92 |
| | 20 | 80 | 90 | 95 |
| Polymer No. 169[4] | 10 | 28 | 36 | 40 |
| | 15 | 70 | 80 | 88 |
| | 20 | 50 | 74 | 80 |

[1]For each sample, the lowest dose shown represents the minimum dose at which activity was observed. All polymers were dosed using solutions of equivalent actives concentration, i.e. 0.29%.
[2]Acrylamide/Acrylate copolymer
[3]Taurine derivatized polyacrylamide.
[4]$CH_2O/Na_2SO_3$ derivatized polyacrylamide.
All products were dosed on an equal actives basis.

We claim:

1. A method of dewatering BOF aqueous scrubbing sludges which contain large amounts of finely divided iron oxides which comprises treating these sludges with a dewatering amount of an acrylamide acrylic acid, N-substituted lower alkyl acrylamide sulfonate terpolymer which contains from 35–80 mole percent of acrylamide, from 10–60 mole percent of acrylic acid and from 1–30 mole percent of the N-substituted lower alkyl acrylamide sulfonate the lower alkyl portion of which contains from 1–6 carbon atoms, which terpolymer has a reduced specific viscosity (RSV) of at least 25, and dewatering said sludges.

2. The method of claim 1 where the N-substituted lower alkyl acrylamide sulfonate is an N-methyl acrylamide sulfonate.

3. The method of claim 1 where the N-substituted lower alkyl acrylamide sulfonate is an N-ethyl acrylamide sulfonate.

* * * * *